US010770720B2

(12) United States Patent
Xia et al.

(10) Patent No.: US 10,770,720 B2
(45) Date of Patent: Sep. 8, 2020

(54) COMPOSITE NEGATIVE ELECTRODE MATERIAL AND METHOD FOR PREPARING COMPOSITE NEGATIVE ELECTRODE MATERIAL, NEGATIVE ELECTRODE PLATE OF LITHIUM ION SECONDARY BATTERY, AND LITHIUM ION SECONDARY BATTERY

(71) Applicant: Huawei Technologies Co., Ltd., Shenzhen (CN)

(72) Inventors: Shengan Xia, Shenzhen (CN); Hui Li, Shenzhen (CN); Fengchao Xie, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 149 days.

(21) Appl. No.: 15/339,081

(22) Filed: Oct. 31, 2016

(65) Prior Publication Data
US 2017/0047585 A1 Feb. 16, 2017

Related U.S. Application Data

(63) Continuation of application No. PCT/CN2014/088167, filed on Oct. 9, 2014.

(30) Foreign Application Priority Data
Apr. 29, 2014 (CN) .......................... 2014 1 0177200

(51) Int. Cl.
*H01M 4/13* (2010.01)
*H01M 4/36* (2006.01)
(Continued)

(52) U.S. Cl.
CPC ......... *H01M 4/366* (2013.01); *H01M 4/0404* (2013.01); *H01M 4/0471* (2013.01);
(Continued)

(58) Field of Classification Search
CPC .. H01M 4/366; H01M 4/0404; H01M 4/0471; H01M 4/133; H01M 4/587; H01M 4/62; H01M 10/0525; H01M 2004/027
See application file for complete search history.

(56) References Cited

U.S. PATENT DOCUMENTS 6,884,545 B2   4/2005 Fukuda et al.
2008/0078815 A1*  4/2008 Taniguchi .............. B23K 20/10
                                                    228/110.1
(Continued)

FOREIGN PATENT DOCUMENTS

CN      101210112 A    7/2008
CN      101249959 A    8/2008
(Continued)

OTHER PUBLICATIONS

Machine Translation and Abstract of Chinese Publication No. CN101887966, Nov. 17, 2010, 13 pages.
(Continued)

*Primary Examiner* — Raymond Alejandro
(74) *Attorney, Agent, or Firm* — Conley Rose, P.C.

(57) ABSTRACT

A composite negative electrode material, a method for preparing the composite negative electrode material, a negative electrode plate of a lithium ion secondary battery containing the composite negative electrode material, and a lithium ion secondary battery containing a negative electrode active material of the lithium ion secondary battery, where the composite negative electrode material includes a carbon core and a carbon coating layer, where the carbon coating layer is a carbon layer that coats a surface of the carbon core, and both the carbon core and the carbon coating layer include a doping element, where the doping element is at least one of element N, P, B, S, O, F, Cl, or H.

20 Claims, 3 Drawing Sheets

(51) Int. Cl.
H01M 4/133 (2010.01)
H01M 10/0525 (2010.01)
H01M 4/587 (2010.01)
H01M 4/04 (2006.01)
H01M 4/62 (2006.01)
H01M 4/02 (2006.01)

(52) U.S. Cl.
CPC .......... H01M 4/133 (2013.01); H01M 4/587 (2013.01); H01M 4/62 (2013.01); H01M 10/0525 (2013.01); H01M 2004/027 (2013.01)

(56) References Cited

U.S. PATENT DOCUMENTS

| | | |
|---|---|---|
| 2011/0229401 A1 | 9/2011 | Dai et al. |
| 2012/0177995 A1 | 7/2012 | Sun et al. |
| 2013/0280603 A1 | 10/2013 | Yoon et al. |
| 2013/0288155 A1* | 10/2013 | Kim ..................... H01M 4/926 429/483 |
| 2015/0104697 A1 | 4/2015 | Xia et al. |
| 2015/0259205 A1 | 9/2015 | Borsboom et al. |

FOREIGN PATENT DOCUMENTS

| | | |
|---|---|---|
| CN | 101841019 A | 9/2010 |
| CN | 101887966 A | 11/2010 |
| CN | 102034975 A | 4/2011 |
| CN | 102157731 A | 8/2011 |
| CN | 102231434 A | 11/2011 |
| CN | 102306781 A | 1/2012 |
| CN | 102496703 A | 6/2012 |
| CN | 102569804 A | 7/2012 |
| CN | 102646839 A | 8/2012 |
| CN | 102832378 A | 12/2012 |
| CN | 103050699 A | 4/2013 |
| CN | 103094528 A | 5/2013 |
| CN | 103647055 A | 3/2014 |
| CN | 103682277 A | 3/2014 |
| CN | 103682327 A | 3/2014 |
| CN | 103700818 A | 4/2014 |
| CN | 103702939 A | 4/2014 |
| CN | 104347858 A | 2/2015 |
| EP | 2424013 A1 | 2/2012 |

OTHER PUBLICATIONS

Machine Translation and Abstract of Chinese Publication No. CN102034975, Apr. 27, 2011, 8 pages.
Translation and Abstract of Chinese Publication No. CN102832378, Dec. 19, 2012, 11 pages.
Translation and Abstract of Chinese Publication No. CN103050699, Apr. 17, 2013, 12 pages.
Translation and Abstract of Chinese Publication No. CN103094528, May 8, 2013, 16 pages.
Translation and Abstract of Chinese Publication No. CN103647055, Mar. 19, 2014, 4 pages.
Translation and Abstract of Chinese Publication No. CN101210112, Jul. 2, 2008, 11 pages.
Translation and Abstract of Chinese Publication No. CN101249959, Aug. 27, 2008, 5 pages.
Translation and Abstract of Chinese Publication No. CN102034975, Apr. 27, 2011, 5 pages.
Translation and Abstract of Chinese Publication No. CN102231434, Nov. 2, 2011, 9 pages.
Translation and Abstract of Chinese Publication No. CN102306781, Jan. 4, 2012, 9 pages.
Translation and Abstract of Chinese Publication No. CN102569804, Jul. 11, 2012, 16 pages.
Translation and Abstract of Chinese Publication No. CN103682277, Mar. 26, 2014, 9 pages.
Machine Translation and Abstract of Chinese Publication No. CN103682327, Mar. 26, 2014, 10 pages.
Machine Translation and Abstract of Chinese Publication No. CN103700818, Apr. 2, 2014, 6 pages.
Machine Translation and Abstract of Chinese Publication No. CN104347858, Feb. 11, 2015, 17 pages.
Lee, W., et al., "Nitrogen-doped carbon nanotubes and graphene composite structures for energy and catalytic applications," XP55133151, ChemComm, 2014, pp. 6818-6830.
Gu, Z., et al., "Synthesis and Characterization of Polypyrrole/ Graphite Oxide Composite by In Situ Emulsion Polymerization," XP55341840, Journal of Polymer Science Part B: Polymer Physics, vol. 48, No. 12, Mar. 27, 2010, pp. 1329-1335.
Chen, L., et al., "Facile Preparation of Nitrogen-Doped Activated Carbon for Carbon Dioxide Adsorption," XP55341966, Aerosol and Air Quality Research, Apr. 2014, pp. 916-927.
An, B., et al., "Carbon nanotubes coated with a nitrogen-doped carbon layer and its enhanced electrochemical capacitance," XP55342033, Journal of Materials Chemistry A, vol. 1, No. 24, Apr. 11, 2013, pp. 7222-7228.
Chao, S., et al., "Tuning Synthesis of Highly Active Nitrogen-doped Graphite and Determining the Optimal Structure from First-principles Calculations," XP55342037, Jun. 1, 2013, pp. 8786-8799.
Foreign Communication From a Counterpart Application, Chinese Application No. 201410177200.4, Chinese Search Report dated Dec. 7, 2016, 2 pages.
Foreign Communication From a Counterpart Application, Chinese Application No. 201410177200.4, Chinese Office Action dated Dec. 19, 2016, 9 pages.
Foreign Communication From a Counterpart Application, European Application No. 14890939.3, Extended European Search Report dated Feb. 10, 2017, 14 pages.
Foreign Communication From a Counterpart Application, PCT Application No. PCT/CN2014/088167, English Translation of International Search Report dated Dec. 30, 2014, 3 pages.
Foreign Communication From a Counterpart Application, PCT Application No. PCT/CN2014/088167, English Translation of Written Opinion dated Dec. 30, 2014, 11 pages.
Machine Translation and Abstract of Chinese Publication No. CN102496703, Jun. 13, 2012, 9 pages.
Machine Translation and Abstract of Chinese Publication No. CN102646839, Aug. 22, 2012, 12 pages.
Foreign Communication From a Counterpart Application, Chinese Application No. 201410177200.4, Chinese Office Action dated Sep. 29, 2017, 9 pages.

* cited by examiner

COMPOSITE NEGATIVE ELECTRODE MATERIAL AND METHOD FOR PREPARING COMPOSITE NEGATIVE ELECTRODE MATERIAL, NEGATIVE ELECTRODE PLATE OF LITHIUM ION SECONDARY BATTERY, AND LITHIUM ION SECONDARY BATTERY

CROSS-REFERENCE TO RELATED APPLICATIONS

This application is a continuation of International Application No. PCT/CN2014/088167, filed on Oct. 9, 2014, which claims priority to Chinese Patent Application No. 201410177200.4, filed on Apr. 29, 2014. The disclosures of the aforementioned applications are hereby incorporated by reference in their entireties.

TECHNICAL FIELD

The present disclosure relates to the field of lithium ion secondary batteries, and in particular, to a composite negative electrode material and a method for preparing the composite negative electrode material, a negative electrode plate of a lithium ion secondary battery, and a lithium ion secondary battery.

BACKGROUND

A graphite negative electrode material of a lithium battery has advantages such as a long cycle life, high initial efficiency, low costs, environmentally friendliness, and ease of processing. Therefore, this material has been widely applied in fields of portable electronic devices, electric vehicles, and energy storage.

However, a theoretical specific capacity of graphite is relatively low (about 372 milliampere hours (mAh)/gram (g)), and the graphite has poor compatibility with electrolyte and has poor rate performance. Although compatibility between the graphite and the electrolyte is improved using a carbon coating technology, the rate performance of the graphite is still hard to be improved, and a capacity of the graphite almost reaches a limit.

SUMMARY

In view of this, a first aspect of embodiments of the present disclosure provides a composite negative electrode material that features a high capacity, low costs, a long service life, and high-rate charging and discharging, where the composite negative electrode material can break through theoretical capacity and rate limits of a graphite negative electrode.

According to the first aspect, an embodiment of the present disclosure provides a composite negative electrode material, where the composite negative electrode material includes a carbon core and a carbon coating layer, where the carbon coating layer is a carbon layer that coats a surface of the carbon core, and the carbon core includes a first doping element, where the first doping element is at least one of element N, P, B, S, O, F, Cl, or H.

With reference to the first aspect, in a first feasible manner of the first aspect, the carbon coating layer includes a second doping element, where the second doping element is at least one of element N, P, B, S, O, F, Cl, or H, and the first doping element and the second doping element may be the same or may be different.

With reference to the first aspect or the first feasible manner of the first aspect, in a second feasible manner of the first aspect, a mass of the carbon coating layer is 5% to 30% a total mass of the carbon coating layer and the carbon core.

With reference to the first aspect or the first feasible manner of the first aspect or the second feasible manner of the first aspect, in a third feasible manner of the first aspect, a mass content of the doping elements in the composite negative electrode material is 0.1% to 50%.

With reference to the first aspect or the first feasible manner of the first aspect or the second feasible manner of the first aspect or the third feasible manner of the first aspect, in a fourth feasible manner of the first aspect, the carbon core includes at least one type of natural graphite, artificial graphite, expanded graphite, graphite oxide, hard carbon, soft carbon, graphene, carbon nanotube, or carbon fiber.

According to a second aspect, an embodiment of the present disclosure provides a method for preparing the composite negative electrode material according to any one of the first aspect, includes mixing and shaking ionic liquid (such as triphenyl boron, 3-methyl-butyl pyridinium dicyanamide, or 1-ethyl-3-methylimidazolium dicyanamide) and a carbon material, to obtain a first compound, and placing the first compound in a tube furnace, pumping in a gas mixture of inert carrier gas and hydride containing a doping element, and performing calcination to obtain the composite negative electrode material.

With reference to the second aspect, in a first possible implementation manner of the second aspect, a time for mixing and shaking the ionic liquid and the carbon material is 30 minutes to 120 minutes. The pumping in a gas mixture of inert carrier gas and hydride containing a doping element includes pumping in the gas mixture of the inert carrier gas and the hydride containing a doping element at a rate of 5 milliliters (ml or mL)/minute (min) to 100 ml/min, where a ratio of a volume of the hydride containing a doping element to a volume of the inert gas is 1:1 to 1:10, and performing calcination to obtain the composite negative electrode material further includes heating up the tube furnace to 500 Celsius (° C.) to 1000° C. at a heating rate of 1° C./min to 10° C./min, and preserving heat for 0.5 hour to 12 hours, where the composite negative electrode material can be obtained after the tube furnace cools to a room temperature.

According to a third aspect, an embodiment of the present disclosure provides a method for preparing the composite negative electrode material according to any one of the first aspect, includes placing a carbon material in a tube furnace, vacuumizing the tube furnace, pumping a gas mixture of inert carrier gas and hydride containing a doping element into the tube furnace, and preserving heat at a temperature of 500° C. to 1000° C. for 1 hour to 12 hours, and pumping a gas mixture of inert carrier gas and a small organic molecule containing a doping element into the tube furnace, and preserving heat at a temperature of 500° C. to 1000° C. for 1 hour to 12 hours, to obtain the composite negative electrode material, where the small organic molecule includes one type of pyridinium, pyrrole, or thiophene.

With reference to the third aspect, in a first possible implementation manner of the third aspect, a ratio of a volume of the hydride containing a doping element to a volume of the inert carrier gas is 1:1 to 1:10, and a ratio of a volume of the small organic molecule containing a doping element to a volume of the inert carrier gas is 1:1 to 1:10.

According to a fourth aspect, an embodiment of the present disclosure provides a method for preparing the composite negative electrode material according to any one of the first aspect, includes dissolving surfactant (such as cetyl trimethyl ammonium bromide, sodium dodecyl benzene sulfonate, or sodium carboxy methyl cellulose) in acid (such as hydrochloric acid (HCl), sulfuric acid, nitric acid, or phosphoric acid), to obtain a first mixed solution, using ultrasound to disperse a carbon material in the first mixed solution, and adding in oxidant (such as ammonium persulfate, ferric trichloride, or ferric sulfate), to obtain turbid liquid, adding a pyrrole monomer to the turbid liquid, to obtain a second mixed solution, performing heat reaction on the second mixed solution, to obtain a black sediment, and washing the black sediment until the black sediment becomes neutral and drying the black sediment, placing the dried black sediment in a tube furnace, pumping in a gas mixture of inert carrier gas and hydride containing a doping element, and performing sintering, to obtain the composite negative electrode material.

With reference to the fourth aspect, in a first possible implementation manner of the fourth aspect, performing heat reaction on the second mixed solution, to obtain a black sediment further includes performing heat reaction on the second mixed solution at a temperature of 0° C. to 4° C. for 1 h to 24 h and then performing filtering, to obtain the black sediment, and washing the black sediment until the black sediment becomes neutral and drying the black sediment, placing the dried black sediment in a tube furnace, pumping in a gas mixture of inert carrier gas and hydride containing a doping element, and performing sintering, to obtain the composite negative electrode material further includes using a hydrogen chloride solution to wash the black sediment until the black sediment becomes neutral and drying the black sediment at 50° C. to 100° C. for 1 hour to 24 hours, placing the dried black sediment in the tube furnace, pumping in the gas mixture of the inert carrier gas and the hydride containing a doping element, and performing sintering at 500° C. to 1000° C. for 0.5 hour to 10 hours, to obtain the composite negative electrode material.

According to a fifth aspect, an embodiment of the present disclosure provides a negative electrode plate of a lithium ion secondary battery, where the negative electrode plate of the lithium ion secondary battery includes a current collector and a composite negative electrode material that covers the current collector.

According to a sixth aspect, an embodiment of the present disclosure provides a lithium ion secondary battery, where the lithium ion secondary battery includes a negative electrode plate of the lithium ion secondary battery, a positive electrode, a separator, a non-aqueous electrolyte, and a shell, and the negative electrode plate of the lithium ion secondary battery includes a current collector and a composite negative electrode material that covers the current collector.

It can be learned from the foregoing description that, the composite negative electrode material provided in the first aspect of the embodiments of the present disclosure includes a graphite core and a carbon coating layer, and both the graphite core and the carbon coating layer are doped with an element. The doping element is used to form a lattice defect at a carbon layer, which not only can improve electron cloud mobility, but also can reduce energy barriers of lithium storage, increase lithium storage binding sites, increase a distance between graphite carbon layers, greatly improve a migration speed of lithium ions, and break through a theoretical capacity of 372 mAh/g of graphite, thereby improving a capacity and rate performance of the composite negative electrode material. The method, provided in the second aspect to the fourth aspect of the embodiments of the present disclosure, for preparing the composite negative electrode material according to any one of the first aspect features simple and convenient processing and low costs, and is easy for industrialized production. The negative electrode plate, of the lithium ion secondary battery, provided in the fifth aspect of the embodiments of the present disclosure and the lithium ion secondary battery provided in the sixth aspect feature a long service life and good electrical conductivity.

Advantages of the embodiments of the present disclosure are partially described in the following specification, and some advantages are obvious according to the specification, or may be learned through implementation of the embodiments of the present disclosure.

DESCRIPTION OF EMBODIMENTS

Figure 1:
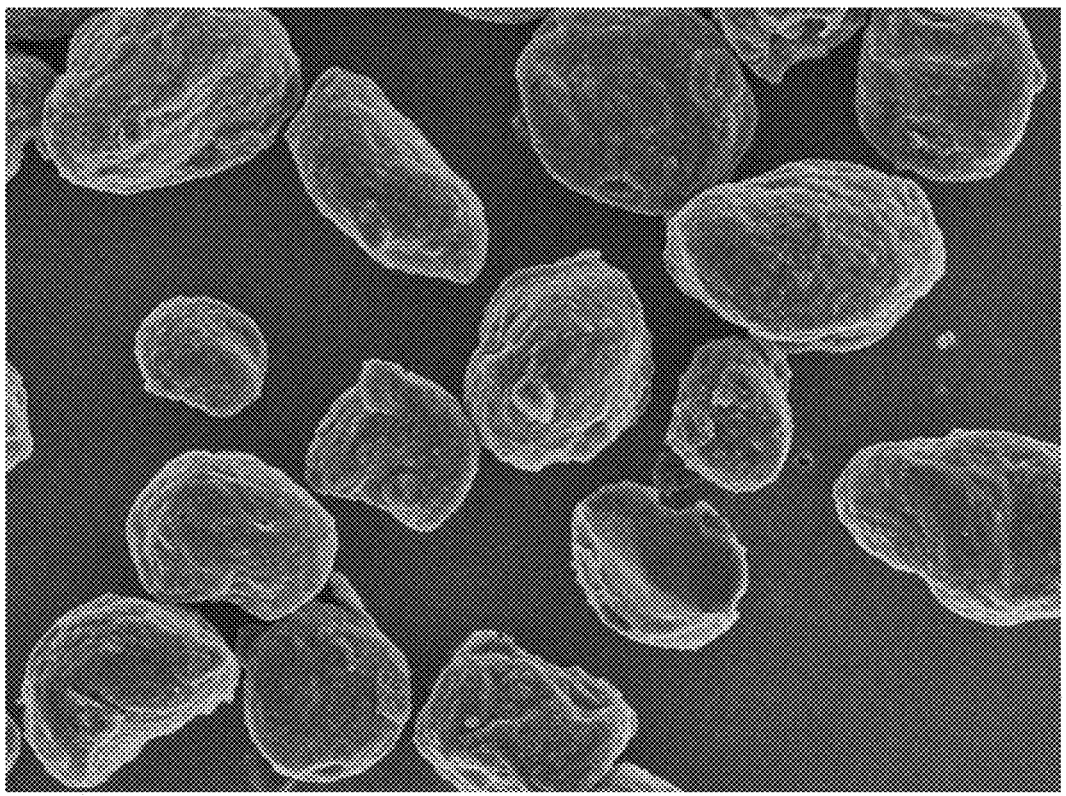
FIG. 1 is an scanning electron microscope (SEM) diagram of a composite negative electrode material prepared in Embodiment 1 of the present disclosure.

The following descriptions are optional implementation manners of embodiments of the present disclosure. It should be noted that a person of ordinary skill in the art may make certain improvements and polishing without departing from the principle of the present disclosure and the improvements and polishing shall fall within the protection scope of the present disclosure.

A first aspect of the embodiments of the present disclosure provides a composite negative electrode material, which resolves a problem in the prior art that rate performance is hard to be improved and a capacity almost reaches a limit. A second aspect to a fourth aspect of the embodiments of the present disclosure provide a method for preparing the composite negative electrode material according to the first aspect. The method features simple and convenient processing and low costs, and is easy for industrialized production. A fifth aspect of the embodiments of the present disclosure provides a negative electrode plate of a lithium ion secondary battery that contains the composite negative electrode material according to the first aspect, and a sixth aspect of the embodiments of the present disclosure provides a lithium ion secondary battery that contains the composite negative electrode material according to the first aspect.

According to the first aspect, an embodiment of the present disclosure provides a composite negative electrode material, where the composite negative electrode material includes a carbon core and a carbon coating layer, where the carbon coating layer is a carbon layer that coats a surface of the carbon core, and the carbon core includes a first doping element, where the first doping element is at least one of element N, P, B, S, O, F, Cl, or H.

Optionally, the carbon coating layer includes a second doping element, where the second doping element is at least one of element N, P, B, S, O, F, Cl, or H, and the first doping element and the second doping element may be the same or may be different.

Optionally, a mass of the carbon coating layer is 5% to 30% a total mass of the carbon coating layer and the carbon core.

Optionally, a mass content of the doping elements in the composite negative electrode material is 0.1% to 50%.

Optionally, the carbon core includes at least one type of natural graphite, artificial graphite, expanded graphite, graphite oxide, hard carbon, soft carbon, graphene, carbon nanotube, or carbon fiber.

The first aspect of the embodiments of the present disclosure provides a composite negative electrode material, where the composite negative electrode material includes a graphite core and a carbon coating layer, and both the graphite core and the carbon coating layer are doped with an element. The doping element is used to form a lattice defect at a carbon layer, which not only can improve electron cloud mobility, but also can reduce energy barriers of lithium storage, increase lithium storage binding sites, increase a distance between graphite carbon layers, greatly improve a migration speed of lithium ions, and break through a theoretical capacity of 372 mAh/g of graphite, thereby improving a capacity and rate performance of the composite negative electrode material.

According to the second aspect, an embodiment of the present disclosure provides a method for preparing the composite negative electrode material according to the first aspect, where the composite negative electrode material is prepared according to one of the following methods.

Method 1: Mixing and shaking ionic liquid (such as triphenyl boron, 3-methyl-butyl pyridinium dicyanamide, or 1-ethyl-3-methylimidazolium dicyanamide) and a carbon material, to obtain a first compound, and placing the first compound in a tube furnace, pumping in a gas mixture of inert carrier gas and hydride containing a doping element, and performing calcination to obtain the composite negative electrode material.

Optionally, in method 1, a time for mixing and shaking the ionic liquid and the carbon material is 30 minutes to 120 minutes, the gas mixture of the inert carrier gas and the hydride containing a doping element is pumped in at a rate of 5 ml/min to 100 ml/min, and a ratio of a volume of the hydride containing a doping element to a volume of the inert gas is 1:1 to 1:10, and performing calcination to obtain the composite negative electrode material further includes heating up the tube furnace to 500° C. to 1000° C. at a heating rate of 1° C./min to 10° C./min, and preserving heat for 0.5 hour to 12 hours, where the composite negative electrode material can be obtained after the tube furnace cools to a room temperature.

Method 2: Placing a carbon material in a tube furnace, vacuumizing the tube furnace, pumping a gas mixture of inert carrier gas and hydride containing a doping element into the tube furnace, and preserving heat at a temperature of 500° C. to 1000° C. for 1 hour to 12 hours, and pumping a gas mixture of inert carrier gas and a small organic molecule containing a doping element into the tube furnace, and preserving heat at a temperature of 500° C. to 1000° C. for 1 hour to 12 hours, to obtain the composite negative electrode material, where the small organic molecule includes one type of pyridinium, pyrrole, or thiophene.

Optionally, in method 2, a ratio of a volume of the hydride containing a doping element to a volume of the inert carrier gas is 1:1 to 1:10, and a ratio of a volume of the small organic molecule containing a doping element to a volume of the inert carrier gas is 1:1 to 1:10.

Method 3: Dissolving surfactant (such as cetyl trimethyl ammonium bromide, sodium dodecyl benzene sulfonate, or sodium carboxy methyl cellulose) in acid (such as HCl, sulfuric acid, nitric acid, or phosphoric acid), to obtain a first mixed solution, using ultrasound to disperse a carbon material in the first mixed solution, and adding in oxidant (such as ammonium persulfate, ferric trichloride, or ferric sulfate), to obtain turbid liquid, adding a pyrrole monomer to the turbid liquid, to obtain a second mixed solution, performing heat reaction on the second mixed solution, to obtain a black sediment, and washing the black sediment until the black sediment becomes neutral and drying the black sediment, placing the dried black sediment in a tube furnace, pumping in a gas mixture of inert carrier gas and hydride containing a doping element, and performing sintering, to obtain the composite negative electrode material.

Optionally, in method 3, performing heat reaction on the second mixed solution, to obtain a black sediment further includes performing heat reaction on the second mixed solution at a temperature of 0° C. to 4° C. for 1 h to 24 h and then performing filtering, to obtain the black sediment, and washing the black sediment until the black sediment becomes neutral and drying the black sediment, placing the dried black sediment in a tube furnace, pumping in a gas mixture of inert carrier gas and hydride containing a doping element, and performing sintering, to obtain the composite negative electrode material further includes using a hydrogen chloride solution to wash the black sediment until the black sediment becomes neutral and drying the black sediment at 50° C. to 100° C. for 1 hour to 24 hours, placing the dried black sediment in the tube furnace, pumping in the gas mixture of the inert carrier gas and the hydride containing a doping element, and performing sintering at 500° C. to 1000° C. for 0.5 hour to 10 hours, to obtain the composite negative electrode material.

A method, for preparing a negative electrode active material of a lithium ion secondary battery, provided in the second aspect of the embodiments of the present disclosure features simple and convenient processing and low costs, and is easy for industrialized production.

According to the third aspect, an embodiment of the present disclosure provides a negative electrode plate of a lithium ion secondary battery, where the negative electrode plate of the lithium ion secondary battery includes a current collector and a composite negative electrode material that covers the current collector. The negative electrode plate of the lithium ion secondary battery provided in the third aspect of the embodiments of the present disclosure features a long service life and good electrical conductivity, where the negative electrode active material of the lithium ion secondary battery is described in the first aspect.

According to a fourth aspect, an embodiment of the present disclosure provides a lithium ion secondary battery, where the lithium ion secondary battery includes a negative electrode plate of the lithium ion secondary battery, a positive electrode, a separator, a non-aqueous electrolyte, and a shell, and the negative electrode plate of the lithium ion secondary battery includes a current collector and a composite negative electrode material that covers the current collector. The lithium ion secondary battery provided in the fourth aspect of the embodiments of the present disclosure features a long service life and good electrical conductivity, where the negative electrode active material of the lithium ion secondary battery is described in the first aspect.

The following uses multiple embodiments to further describe the embodiments of the present disclosure. The embodiments of the present disclosure are not limited to the following specific embodiments, and can be properly modified for implementation without changing a scope of independent claims.

Embodiment 1

A method for preparing a composite negative electrode material, includes dissolving 7.3 g of cetyl trimethyl ammonium bromide (CTAB, $(C_{16}H_{33})N(CH_3)_3Br$) in an ice-water-bathed HCl (120 mL, 1 mole (mol)/liter (L)) solution, adding in 10 g of natural graphite, performing ultrasonic dispersion for 30 minutes, and then adding in ammonium persulfate (APS) 13.7 g, where white turbid liquid is immediately obtained, adding in 8.3 mL of a pyrrole monomer (Pyrrole) after stirring for 0.5 hour, performing heat reaction at 4° C. for 24 h, and then performing filtering, using an HCl solution of 1 mol/L to wash an obtained black sediment three times and then using purified water to wash the sediment until a solution becomes colorless and neutral. After that, drying the sediment at 80° C. for 24 h. Finally, placing the dried sediment in a tube furnace, pumping in a gas mixture of 10% $N_2H_4/Ar$, and performing sintering at 700° C. for 5 hours, to obtain the composite negative electrode material. FIG. 1 is an SEM diagram of the composite negative electrode material.

The prepared composite negative electrode material, conductive black, and polyvinylidene fluoride are mixed at a mass ratio of 85:10:5 in N-Methylpyrrolidone, and are evenly smeared on a copper foil current collector. The copper foil current collector is dried in a vacuum at 120° C., to obtain an electrode plate. Then, the electrode plate is assembled, in a glove box, into a button battery, and a test is performed. In the button battery, an electrode uses lithium metal, a separator is celgard C2400, and an electrolyte is 1.3 molar (M) LiPF6 in a solution of ethylene carbonate (EC) and diethyl carbonate (DEC) (where a volume ratio is 3:7).

Figure 2:
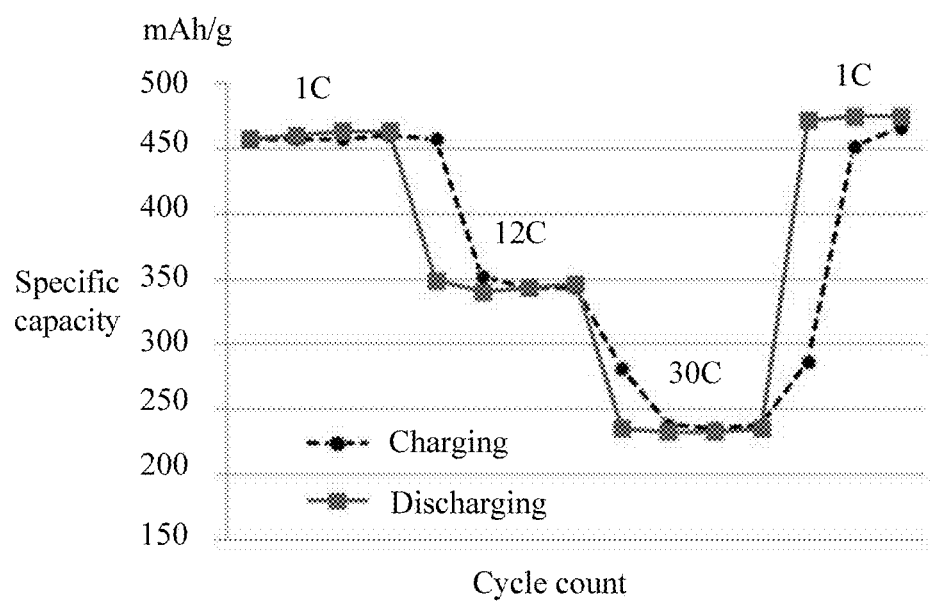
FIG. 2 is a diagram of charge and discharge cycles of a button battery at different rates in Embodiment 1 of the present disclosure.

As shown in FIG. 2, FIG. 2 is a diagram of charge and discharge cycles of the obtained button battery at different currents, where a capacity reaches 460 mAh/g at 1×capacity of the battery (1C) and a capacity retention rate is 50% at 30C.

Figure 3:
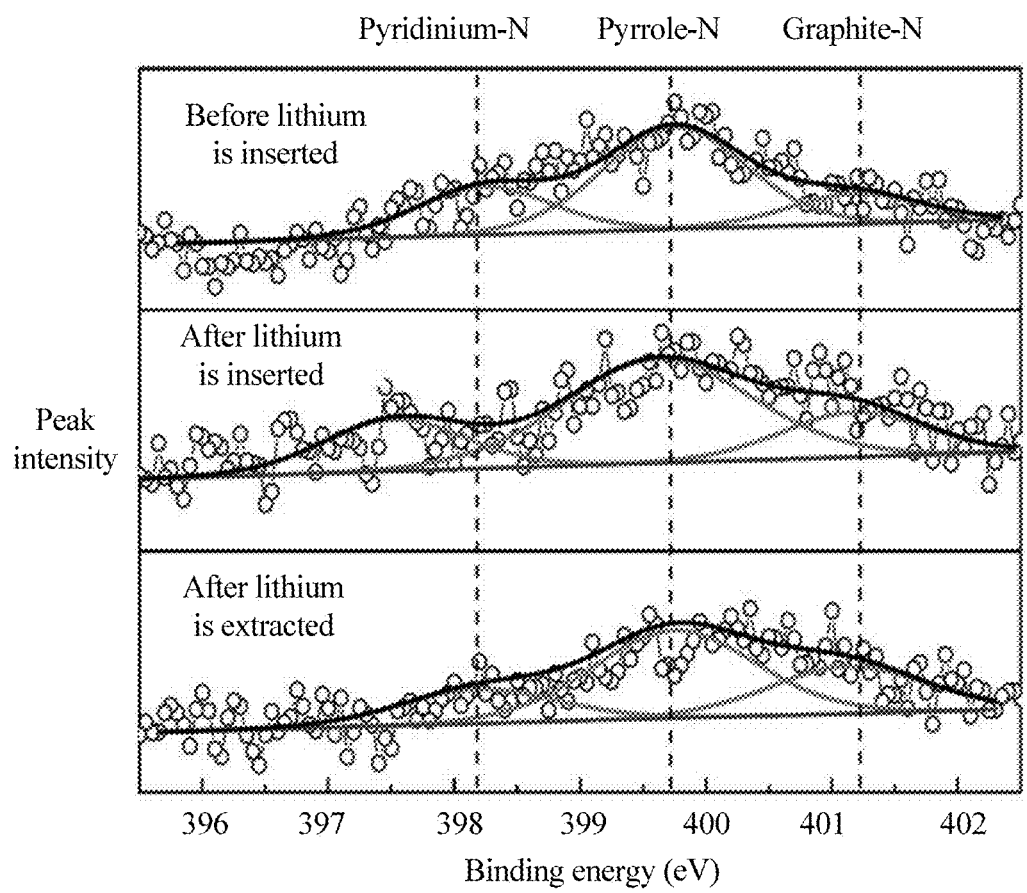
FIG. 3 is an X-ray photoelectron spectroscopy (XPS) spectrum of a composite negative electrode material at different charging statuses in Embodiment 1 of the present disclosure.

As shown in FIG. 3, FIG. 3 is an XPS spectrum of the composite negative electrode material at different charging statuses. It can be seen from the figure that, Nis peaks before lithium is inserted can be fit to three sub-peaks located at 398.2 electron volt (eV), 399.7 eV, and 401.2 eV, which belong to pyridinium-N, pyrrole-N, and graphite-N, respectively. After lithium is fully inserted to the electrode, a peak position of the pyridinium-N is moved to 387.5 eV. This indicates that an oxidation state of the pyridinium-N becomes more negative, and therefore, bond energy is lowered. Position movement of this peak proves that the pyridinium-N can bind with Li+ to form a bond. After lithium is completely extracted, a peak position of the pyridinium-N is back to the original position, which indicates that the Li+ almost completely breaks away from the original position of the pyridinium-N. The foregoing phenomena prove that the Li+ can reversely bond with an N− activated site, especially a pyridinium-N site.

Embodiment 2

A method for preparing a composite negative electrode material, includes dissolving 7.3 g of CTAB in an ice-water-bathed HCl (120 mL, 1 mol/L) solution, adding in 10 g of artificial graphite, performing ultrasonic dispersion for 30 minutes, and then adding in 13.7 g of APS, where white turbid liquid is immediately obtained, adding in 8.3 mL of a Pyrrole after stirring for 0.5 hour, performing heat reaction at 4° C. for 24 h, and then performing filtering, using an HCl solution of 1 mol/L to wash an obtained black sediment three times and then using purified water to wash the sediment until a solution becomes colorless and neutral. After that, drying the sediment at 80° C. for 24 h. Finally, placing the dried sediment in a tube furnace, pumping in a gas mixture of 15% $PH_3/Ar$ at a rate of flow controlled at 20 ml/min, heating up the tube furnace to 700° C. at a heating rate of 2° C./min, and preserving heat for 5 hours, to obtain the composite negative electrode material.

The prepared composite negative electrode material, conductive black, and polyvinylidene fluoride are mixed at a mass ratio of 85:10:5 in N-Methylpyrrolidone, and are evenly smeared on a copper foil current collector. The copper foil current collector is dried in a vacuum at 120° C., to obtain an electrode plate. Then, the electrode plate is assembled, in a glove box, into a button battery, and a test is performed. In the button battery, an electrode uses lithium metal, a separator is celgard C2400, and an electrolyte is 1.3M LiPF6 in a solution of EC and DEC (where a volume ratio is 3:7). A capacity of the obtained button battery reaches 620 mAh/g at 1C, and a capacity retention rate is 43% at 30C.

Embodiment 3

A method for preparing a composite negative electrode material, includes that in a dry atmosphere, after evenly mixing 5 g of triphenyl boron and 1 g of expanded graphite, performing shaking and mixing, where the shaking takes 60 min, transferring the compound to a crucible and placing the crucible to a tube furnace, pumping in a gas mixture of 30% $NH_3/Ar$ at a rate of flow controlled at 10 ml/min, heating up the tube furnace to 800° C. at a heating rate of 2° C./min, and preserving heat for 6 hours, and then pumping in, as reaction gas, a thiophene monomer gasified using Ar carrier gas (4:1 volume (v)/v), where a rate of Ar flow is controlled at 250 ml/min, and preserving heat for 3 hours, where the composite negative electrode material can be obtained after the tube furnace cools to a room temperature.

The prepared composite negative electrode material, conductive black, and polyvinylidene fluoride are mixed at a mass ratio of 85:10:5 in N-Methylpyrrolidone, and are evenly smeared on a copper foil current collector. The copper foil current collector is dried in a vacuum at 120° C., to obtain an electrode plate. Then, the electrode plate is assembled, in a glove box, into a button battery, and a test is performed. In the button battery, an electrode uses lithium metal, a separator is celgard C2400, and an electrolyte is 1.3M LiPF6 in a solution of EC and DEC (where a volume ratio is 3:7). A capacity of the obtained button battery reaches 510 mAh/g at 1C, and a capacity retention rate is 44% at 30C.

Embodiment 4

A method for preparing a composite negative electrode material, includes that in a dry atmosphere, after evenly mixing 5 g of triphenyl boron and 1 g of expanded graphite, performing shaking and mixing, where the shaking takes 60 min, transferring the compound to a crucible and placing the crucible to a tube furnace, pumping in a gas mixture of 30% $NH_3/Ar$ at a rate of flow controlled at 10 ml/min, heating up the tube furnace to 800° C. at a heating rate of 2° C./min, and preserving heat for 6 hours, where the composite negative electrode material can be obtained after the tube furnace cools to a room temperature.

The prepared composite negative electrode material, conductive black, and polyvinylidene fluoride are mixed at a mass ratio of 85:10:5 in N-Methylpyrrolidone, and are evenly smeared on a copper foil current collector. The copper foil current collector is dried in a vacuum at 120° C., to obtain an electrode plate. Then, the electrode plate is assembled, in a glove box, into a button battery, and a test is performed. In the button battery, an electrode uses lithium metal, a separator is celgard C2400, and an electrolyte is 1.3M LiPF6 in a solution of EC and DEC (where a volume ratio is 37). A capacity of the obtained button battery reaches 540 mAh/g at 1C, and a capacity retention rate is 51% at 30C.

Embodiment 5

A method for preparing a composite negative electrode material, includes that in a dry atmosphere, after evenly mixing 5 g of triphenyl boron and 1 g of hard carbon, performing shaking and mixing, where the shaking takes 60 min, transferring the compound to a crucible and placing the crucible to a tube furnace, pumping in a gas mixture of 10% $H_2S$/Ar at a rate of flow controlled at 30 ml/min, heating up the tube furnace to 600° C. at a heating rate of 2° C./min, and preserving heat for 4 hours, where the composite negative electrode material can be obtained after the tube furnace cools to a room temperature.

The prepared composite negative electrode material, conductive black, and polyvinylidene fluoride are mixed at a mass ratio of 85:10:5 in N-Methylpyrrolidone, and are evenly smeared on a copper foil current collector. The copper foil current collector is dried in a vacuum at 120° C., to obtain an electrode plate. Then, the electrode plate is assembled, in a glove box, into a button battery, and a test is performed. In the button battery, an electrode uses lithium metal, a separator is celgard C2400, and an electrolyte is 1.3M LiPF6 in a solution of EC and DEC (where a volume ratio is 3:7). A capacity of the obtained button battery reaches 420 mAh/g at 1C, and a capacity retention rate is 42% at 30C.

Embodiment 6

A method for preparing a composite negative electrode material, includes placing 3 g of natural graphite in a tube furnace, vacuumizing the tube furnace, first pumping in, as reaction gas, $BCl_3$ gasified using Ar carrier gas (4:1 v/v), where a rate of Ar flow is controlled at 250 ml/min, heating up the tube furnace to 800° C. at a heating rate of 30° C./min, and preserving heat for 3 hours, and then pumping in, as reaction gas, a pyridinium monomer gasified using Ar carrier gas (5:1 v/v), where a rate of Ar flow is controlled at 50 ml/min, and preserving heat for 6 hours, where the composite negative electrode material can be obtained after the tube furnace cools to a room temperature.

The prepared composite negative electrode active material, conductive black, and polyvinylidene fluoride are mixed at a mass ratio of 85:10:5 in N-Methylpyrrolidone, and are evenly smeared on a copper foil current collector. The copper foil current collector is dried in a vacuum at 120° C., to obtain an electrode plate. Then, the electrode plate is assembled, in a glove box, into a button battery, and a test is performed. In the button battery, an electrode uses lithium metal, a separator is celgard C2400, and an electrolyte is 1.3M LiPF6 in a solution of EC and DEC (where a volume ratio is 3:7). A capacity of the obtained button battery reaches 450 mAh/g at 1C, and a capacity retention rate is 20% at 30C.

Embodiment 7

A method for preparing a composite negative electrode material, includes placing 3 g of artificial graphite in a tube furnace, vacuumizing the tube furnace, first pumping in, as reaction gas, a pyrrole monomer gasified using Ar carrier gas (5:1 v/v), where a rate of Ar flow is controlled at 50 ml/min, heating up the tube furnace to 800° C. at a heating rate of 30° C./min, and preserving heat for 6 hours, and then pumping in 25% $PH_3$/Ar, where a rate of flow is controlled at 100 ml/min, and preserving heat for 4 hours, where the composite negative electrode material can be obtained after the tube furnace cools to a room temperature.

The prepared composite negative electrode material, conductive black, and polyvinylidene fluoride are mixed at a mass ratio of 85:10:5 in N-Methylpyrrolidone, and are evenly smeared on a copper foil current collector. The copper foil current collector is dried in a vacuum at 120° C., to obtain an electrode plate. Then, the electrode plate is assembled, in a glove box, into a button battery, and a test is performed. In the button battery, an electrode uses lithium metal, a separator is celgard C2400, and an electrolyte is 1.3M LiPF6 in a solution of EC and DEC (where a volume ratio is 3:7). A capacity of the obtained button battery reaches 430 mAh/g at 1C, and a capacity retention rate is 25% at 30C.

Comparison Example 1 placing 3 g of natural graphite in a tube furnace, vacuumizing the tube furnace, pumping in Ar/methane (where a volume ratio is 8:2) as reaction gas, where a rate of air flow is controlled at 50 ml/min, heating up the tube furnace to 700° C. at a heating rate of 30° C./min, and preserving heat for 6 hours, where a carbon-coated graphite negative electrode material can be obtained after the tube furnace cools to a room temperature.

The prepared composite negative electrode material, conductive black, and polyvinylidene fluoride are mixed at a mass ratio of 85:10:5 in N-Methylpyrrolidone, and are evenly smeared on a copper foil current collector. The copper foil current collector is dried in a vacuum at 120° C., to obtain an electrode plate. Then, the electrode plate is assembled, in a glove box, into a button battery, and a test is performed. In the button battery, an electrode uses lithium metal, a separator is celgard C2400, and an electrolyte is 1.3M LiPF6 in a solution of EC and DEC (where a volume ratio is 3:7). A capacity of the obtained button battery reaches 365 mAh/g at 1C, and a capacity retention rate is 5% at 30C.

It can be learned, according to Embodiment 7 and Comparison Example 1, that an actual capacity of the composite negative electrode material breaks through a theoretical capacity (which is 372 mAh/g at present) of a conventional graphite negative electrode material, and the composite negative electrode material greatly improves rapid-charge and rapid-discharge capabilities of a graphite material.

Effect embodiment: To strongly support beneficial effects of the embodiments of the present disclosure, an effect embodiment is provided as follows and is used to evaluate performance of a product provided in the embodiments of the present disclosure.

It can be learned from Embodiment 1 to Embodiment 7 of the present disclosure that when compared with a carbon-coating graphite negative electrode material prepared at a same temperature in Comparison Example 1, a prepared composite negative electrode material has a high capacity and rapid-charge and rapid-discharge capabilities. This is because a doping element forms a lattice defect at a carbon layer, which not only can improve electron cloud mobility, but also can reduce energy barriers of lithium storage, increase lithium storage binding sites, increase a distance between graphite carbon layers, greatly improve a migration speed of lithium ions, and break through a theoretical capacity of 372 mAh/g of graphite.

What is claimed is:

1. A composite negative electrode, comprising:
   a doped carbon core containing a first doping element, wherein the first doping element comprises nitrogen, wherein a nitrogen atom of the first doping element and a carbon atom in the doped carbon core are bonded in at least one form of pyridinic nitrogen, graphite nitrogen or pyrrolic nitrogen; and
   a doped carbon coating layer that coats a surface of the doped carbon core, wherein the doped carbon coating layer comprises a second doping element that is P, B, S, O, F, Cl, or H, and wherein the first doping element is different from the second doping element.

2. The composite negative electrode of claim 1, wherein a mass of the doped carbon coating layer is 5% to 30% of a total mass of the doped carbon coating layer and the doped carbon core.

3. The composite negative electrode of claim 1, wherein a mass content of the first doping element and the second doping element in the composite negative electrode is 0.1% to 50%.

4. The composite negative electrode of claim 1, wherein the doped carbon core comprises natural graphite.

5. The composite negative electrode of claim 1, wherein the second doping element is not S.

6. The composite negative electrode of claim 5, wherein a specific capacity of the doped carbon core is greater than 372 milliamperehours/gram (mAh/g).

7. The composite negative electrode of claim 6, wherein the specific capacity of the doped carbon core is 420-620 mAh/g.

8. A negative electrode plate of a lithium ion secondary battery, comprising:
   a current collector; and
   a composite negative electrode that covers the current collector, wherein the composite negative electrode comprises:
      a doped carbon core containing a first doping element, wherein the first doping element comprises nitrogen, wherein a nitrogen atom of the first doping element and a carbon atom in the doped carbon core are bonded in at least one form of pyridinic nitrogen, graphite nitrogen or pyrrolic nitrogen; and
      a doped carbon coating layer that coats a surface of the doped carbon core, wherein the doped carbon coating layer comprises a second doping element that is N, P, B, S, F, Cl, or H, and wherein the first doping element of the carbon core is different from the second doping element.

9. The negative electrode plate of claim 8, wherein a mass of the doped carbon coating layer is 5% to 30% of a total mass of the doped carbon coating layer and the doped carbon core.

10. The negative electrode plate of claim 8, wherein a mass content of the first doping element and the second doping element in the composite negative electrode is 0.1% to 50%.

11. The negative electrode plate of claim 8, wherein the doped carbon core comprises natural graphite.

12. The negative electrode plate of the lithium ion secondary battery of claim 8, wherein the second doping element is not S.

13. The negative electrode plate of the lithium ion secondary battery of claim 12, wherein a specific capacity of the doped carbon core is greater than 372 milliamperehours/gram (mAh/g).

14. The negative electrode plate of the lithium ion secondary battery of claim 13, wherein the specific capacity of the doped carbon core is 420-620 mAh/g.

15. A lithium ion secondary battery, comprising:
   a negative electrode plate of the lithium ion secondary battery that comprises:
      a current collector; and
      a composite negative electrode that covers the current collector, wherein the composite negative electrode comprises:
         a doped carbon core containing a first doping element, wherein the first doping element comprises nitrogen, wherein a nitrogen atom of the first doping element and a carbon atom in the doped carbon core are bonded in at least one form of pyridinic nitrogen, graphite nitrogen or pyrrolic nitrogen; and
         a doped carbon coating layer that coats a surface of the doped carbon core, wherein the doped carbon coating layer comprises a second doping element that is N, P, B, S, O, F, Cl, or H, and wherein the first doping element is different from the second doping element;
   a positive electrode;
   a separator separating the negative electrode plate and positive electrode from each other;
   a non-aqueous electrolyte; and
   a shell that houses the negative electrode plate, the positive electrode, the separator, and the non-aqueous electrolyte to form the lithium ion secondary battery.

16. The lithium ion secondary battery of claim 15, wherein a mass of the doped carbon coating layer is 5% to 30% of a total mass of the doped carbon coating layer and the doped carbon core.

17. The lithium ion secondary battery of claim 15, wherein a mass content of the first doping element and the second doping element in the composite negative electrode is 0.1% to 50%.

18. The lithium ion secondary battery of claim 15, wherein the doped carbon core comprises natural graphite.

19. The lithium ion secondary battery of claim 15, wherein the second doping element is not S.

20. The lithium ion secondary battery of claim 19, wherein a specific capacity of the doped carbon core is 420-620 milliamperehours/gram (mAh/g).

* * * * *